United States Patent
Helmick et al.

(10) Patent No.: US 11,662,713 B2
(45) Date of Patent: May 30, 2023

(54) AUTOMATED MACHINE FOR INSERTING WIRES INTO GROMMET CAVITY LOCATIONS OF AN ELECTRICAL CONNECTOR AND METHODS OF OPERATING

(71) Applicant: The Boeing Company, Chicago, IL (US)

(72) Inventors: Eerik J. Helmick, Everett, WA (US); Bradley J. Mitchell, Snohomish, WA (US); Nick S. Evans, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 478 days.

(21) Appl. No.: 16/840,761

(22) Filed: Apr. 6, 2020

(65) Prior Publication Data
US 2020/0233404 A1   Jul. 23, 2020

Related U.S. Application Data

(62) Division of application No. 15/137,556, filed on Apr. 25, 2016, now Pat. No. 10,649,442.

(51) Int. Cl.
*B25J 9/16*   (2006.01)
*H01R 43/20*   (2006.01)
(Continued)

(52) U.S. Cl.
CPC ...... *G05B 19/41805* (2013.01); *B25J 9/1687* (2013.01); *H01R 43/20* (2013.01);
(Continued)

(58) Field of Classification Search
CPC .... G05B 19/41805; G05B 2219/45033; G05B 2219/39183; G05B 2219/45064;
(Continued)

(56) References Cited

U.S. PATENT DOCUMENTS 4,727,637 A * 3/1988 Buckwitz ............... H01R 43/20
29/721
5,198,983 A   3/1993 Blake et al.
(Continued)

FOREIGN PATENT DOCUMENTS

| CN | 101180591 | 5/2008 |
|---|---|---|
| CN | 203481527 | 3/2014 |
| EP | 2 958 201 | 12/2015 |

OTHER PUBLICATIONS

China National Intellectual Property Administration, Office Action, with English translation, App. No. 201710164029.7 (dated Jun. 23, 2021).
(Continued)

*Primary Examiner* — Stephen Holwerda
(74) *Attorney, Agent, or Firm* — Walters & Wasylyna LLC

(57) ABSTRACT

An automated wire insertion machine for inserting wires into grommet cavity locations of an electrical connector includes a controllable wire insertion robot and a processor to generate pre-generated plug maps based upon an original plug map of the grommet cavity locations and to control the wire insertion robot based upon one pre-generated plug map to insert the wires into the grommet cavity locations. The pre-generated plug maps are generated by defining a range of potential error of the grommet cavity locations that includes at least one of a potential rotational error and a potential translational error, defining an acceptable tolerance of the grommet cavity locations that includes at least one of an acceptable rotational tolerance and an acceptable translational tolerance, and calculating offset values of the grommet cavity locations based on the range of potential error and the acceptable tolerance, thereby generating the plurality of pre-generated plug maps.

20 Claims, 5 Drawing Sheets

(51) Int. Cl.
  *G05B 19/418* (2006.01)
  *H01R 107/00* (2006.01)

(52) U.S. Cl.
  CPC .............. *G05B 2219/39183* (2013.01); *G05B 2219/45033* (2013.01); *G05B 2219/45064* (2013.01); *H01R 2107/00* (2013.01); *Y10S 901/02* (2013.01)

(58) Field of Classification Search
  CPC .... H01R 43/20; H01R 2107/00; B25J 9/1687; Y10S 901/02
  See application file for complete search history.

(56) References Cited

U.S. PATENT DOCUMENTS

| | | |
|---|---|---|
| 5,315,757 A | 5/1994 | Koch et al. |
| 9,315,342 B1 | 4/2016 | Mitchell et al. |
| 2004/0037508 A1* | 2/2004 | Daniel ................... H01R 43/28 385/54 |
| 2012/0304439 A1* | 12/2012 | Larisch .................. H01R 43/20 700/254 |
| 2014/0041215 A1* | 2/2014 | Barns ..................... H01R 12/73 29/748 |
| 2015/0120047 A1* | 4/2015 | Motoyoshi ............ B25J 9/1697 901/30 |
| 2017/0070021 A1 | 3/2017 | Helmick |
| 2017/0222387 A1 | 8/2017 | Helmick et al. |

OTHER PUBLICATIONS

National Institute of Industrial Property (Brazil), Office Action, with English translation, App. No. BR102017005323-7 (dated Jun. 22, 2022).

China National Intellectual Property Administration, Second Office Action, with English translation, App. No. 201710164029.7 (dated Sep. 16, 2020).

* cited by examiner

AUTOMATED MACHINE FOR INSERTING WIRES INTO GROMMET CAVITY LOCATIONS OF AN ELECTRICAL CONNECTOR AND METHODS OF OPERATING

PRIORITY

This application is a divisional of U.S. Ser. No. 15/137,556 filed on Apr. 25, 2016.

FIELD

The present application relates to wire insertion machines, and is particularly directed to methods of operating an automated machine for inserting wires into grommet cavity locations of an electrical connector and an automated wire insertion machine.

BACKGROUND

A typical wire insertion machine includes a robot that inserts wires into grommet cavity locations of an electrical connector. The electrical connector is mounted on a mounting fixture that is firmly affixed to a base of the wire insertion machine. The wire insertion machine also includes a processing unit that controls the robot to insert wires in accordance with a plug map and program instructions stored in a data storage unit. The plug map comprises spatial coordinates at which the robot is to insert wires into grommet cavity locations of the electrical connector.

A drawback in the operation of the above-described wire insertion machine is that one or more spatial coordinates at which the robot is to insert wires may not align sufficiently with the corresponding true grommet cavity locations of the electrical connector to ensure successful wire insertions. A failed wire insertion occurs when spatial coordinates at which the wire is to be inserted do not align sufficiently with the corresponding true grommet cavity location. It would be desirable to overcome such drawbacks in the operation of wire insertion machines.

SUMMARY

In one aspect, a method of operating an automated machine is provided for inserting wires into grommet cavity locations of an electrical connector to compensate for manufacturing tolerances associated with the electrical connector. The method comprises inserting wires into grommet cavity locations of the electrical connector based upon a plug map having offset values to compensate for manufacturing tolerances associated with the electrical connector.

In another aspect, a method of operating an automated machine is provided for inserting wires into grommet cavity locations of an electrical connector to compensate for manufacturing tolerances associated with the electrical connector. The method comprises storing in a data storage unit a plurality of pre-generated plug maps associated with the electrical connector. The method further comprises retrieving from the data storage unit one of the plurality of pre-generated plug maps. The method also comprises inserting wires into grommet cavity locations of the electrical connector based upon the retrieved one of the plurality of pre-generated plug maps to compensate for manufacturing tolerances associated with the electrical connector.

In another aspect, a method of operating an automated machine is provided for inserting wires into grommet cavity locations of an electrical connector to compensate for manufacturing tolerances associated with the electrical connector. The method comprises storing in a data storage unit local to the automated wire insertion machine an original plug map associated with the electrical connector. The method further comprises receiving offset values from a source external to the automated wire insertion machine. The method further comprises calculating an updated plug map based upon the original plug map and the offset values. The method also comprises inserting wires into grommet cavity locations of the electrical connector based upon the updated plug map to compensate for manufacturing tolerances associated with the electrical connector.

In yet another aspect, an automated wire insertion machine is provided for inserting wires into grommet cavity locations of an electrical connector. The automated wire insertion machine comprises a controllable wire insertion robot, and a processing unit configured to control the wire insertion robot based upon a plug map having offset values to insert wires into the grommet cavity locations of the electrical connector.

Other aspects will become apparent from the following detailed description, the accompanying drawings and the appended claims.

DETAILED DESCRIPTION

The present application is directed to methods of operating an automation machine for inserting wires into an electrical connector. The specific construction of the automated wire insertion machine and the industry in which the machine is implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes an automated wire insertion machine and methods implemented by the Boeing Corporation for insertion of wires in electrical connectors for airplane parts in compliance with Federal Aviation Administration (FAA) regulations.

Figure 1:
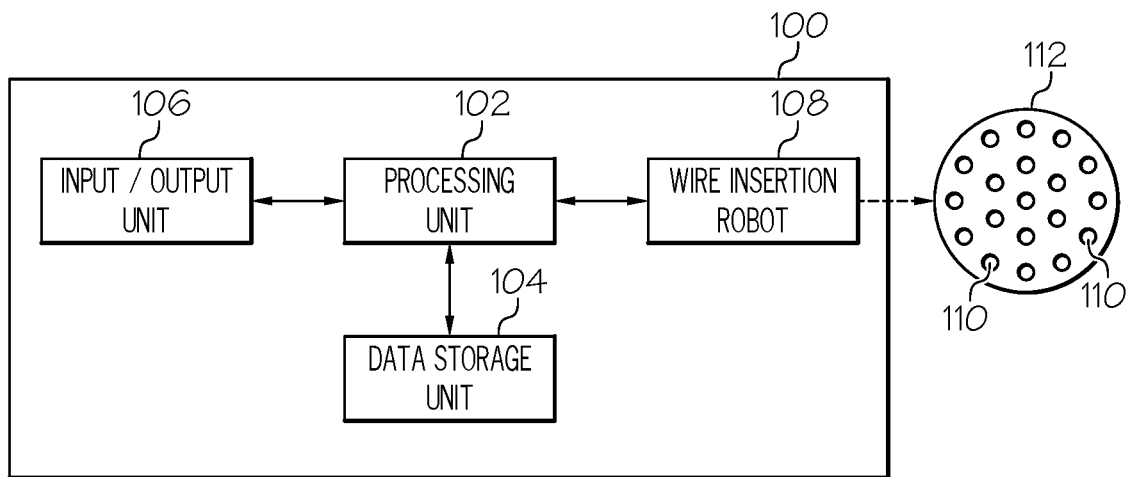
FIG. 1 is a block diagram of an example automated wire insertion machine constructed in accordance with an embodiment.

Referring to FIG. 1, a block diagram of an example automated wire insertion machine 100 constructed in accordance with an embodiment is illustrated. An existing model of a wire insertion machine can be modified to provide automated wire insertion machine 100. For example, model KOMAX® Zeta 656 manufactured by Komax AG Corporation located in Switzerland can be modified to provide automated wire insertion machine 100. Modifications of other models of wire insertion machines are possible.

Automated wire insertion machine 100 includes processing unit 102 that executes instructions stored in internal data storage unit 104, external data storage unit (not shown), or a combination thereof. Processing unit 102 may comprise any type of technology. For example, processing unit 102 may comprise a dedicated-purpose electronic processor. Other types of processors and processing unit technologies are possible. Internal data storage unit 104 may comprise any type of technology. For examples, internal data storage unit 104 may comprise random access memory (RAM), read only memory (ROM), solid state memory, or any combination thereof. Other types of memories and data storage unit technologies are possible.

Automated wire insertion machine 100 further includes a number of input/output (I/O) devices 106 that may comprise any type of technology. For example, I/O devices 106 may comprise a keypad, a keyboard, a touch-sensitive display screen, a liquid crystal display (LCD) screen, a microphone, a speaker, or any combination thereof. Other types of I/O devices and technologies are possible.

Automated wire insertion machine 100 further includes wire insertion robot 108 that is controlled in response to signals from processing unit 102. More specifically, processing unit 102 executes instructions of a wire insertion application program stored in data storage unit 104 to control operation of wire insertion robot 108 to insert wires into grommet cavity locations 110 of electrical connector 112 shown in FIG. 1. Electrical connector 112 may comprise a MIL-spec type of electrical connector, and is mounted on a fixture of automated wire insertion machine 100. Structure and operation of wire insertion robots are known and, therefore, will not be further described.

Figure 2:
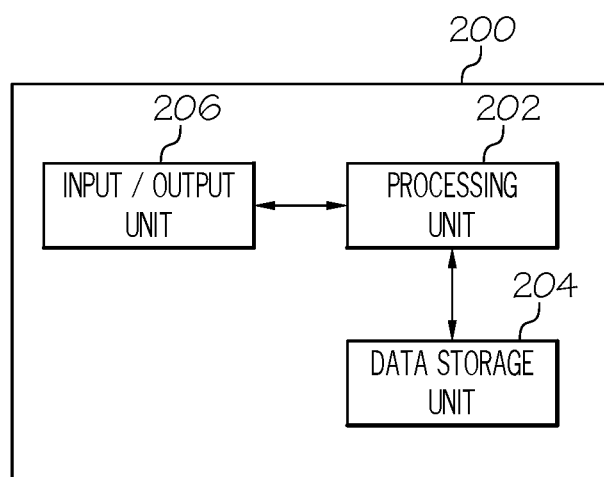
FIG. 2 shows an example computer system external to the automated wire insertion machine of FIG. 1 and capable of providing a plug map having offset values for use in the automated wire insertion machine.

Referring to FIG. 2, an example computer system 200 external to automated wire insertion machine 100 of FIG. 1 and capable of providing a plug map having offset values (as will be described in more detail hereinbelow with reference to FIG. 3) for use in automated wire insertion machine 100 is illustrated. Computer system 200 includes processing unit 202 that executes instructions stored in internal data storage unit 204, external data storage unit (not shown), or a combination thereof. Processing unit 202 may comprise any type of technology. For example, processing unit 202 may comprise a general-purpose electronic processor. Other types of processors and processing unit technologies are possible. Internal data storage unit 204 may comprise any type of technology. For examples, internal data storage unit 204 may comprise random access memory (RAM), read only memory (ROM), solid state memory, or any combination thereof. Other types of memories and data storage unit technologies are possible.

Computer system 200 further includes a number of input/output (I/O) devices 206 that may comprise any type of technology. For example, I/O devices 206 may comprise a keypad, a keyboard, a touch-sensitive display screen, a liquid crystal display (LCD) screen, a microphone, a speaker, or any combination thereof. Other types of I/O devices and technologies are possible.

Figure 3:
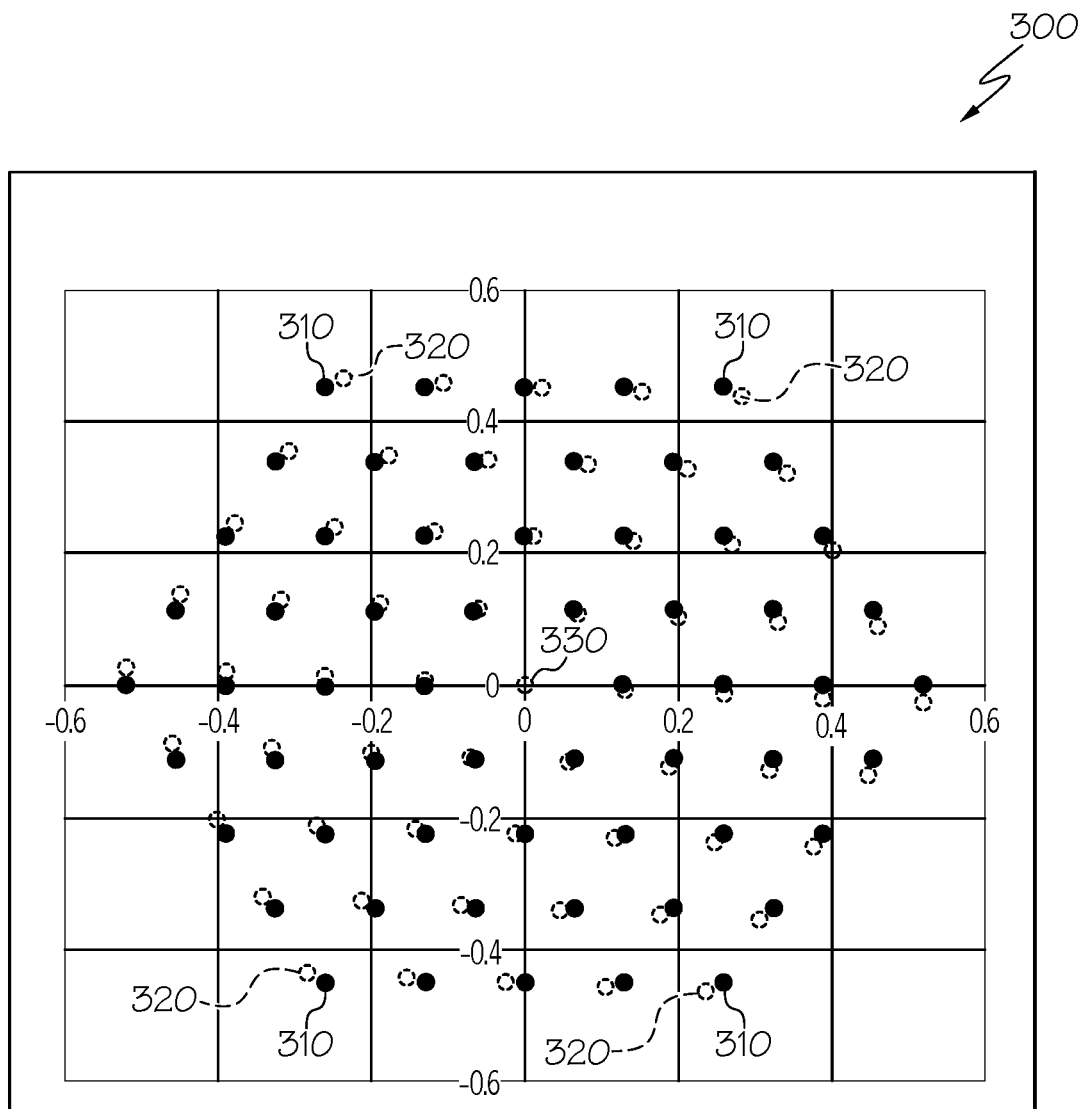
FIG. 3 shows an example plug map having offset values for use in the automated wire insertion machine of FIG. 1.

Referring to FIG. 3, an example plug map 300 having offset values for use in automated wire insertion machine 100 of FIG. 1 is illustrated. More specifically, example plug map 300 includes a first set of cavity locations 310 (shown as solid circles in FIG. 3) that correspond to original cavity locations for electrical connector 112 (FIG. 1). Each of the original cavity locations (i.e., each of the first set of cavity locations 310) corresponds to spatial coordinates at which automated wire insertion machine 100 attempts to insert a wire. Plug map 300 further includes a second set of cavity locations 320 (shown as dashed circles in FIG. 3) that are rotationally offset (i.e., angular offset) about center point 330 relative to the first set of cavity locations 310. Each of the angular offset cavity locations (i.e., each of the second set of cavity locations 320) corresponds to spatial coordinates at which automated wire insertion machine 100 attempts to insert a wire in accordance with example embodiments as will be described in detail hereinbelow.

Figure 4:
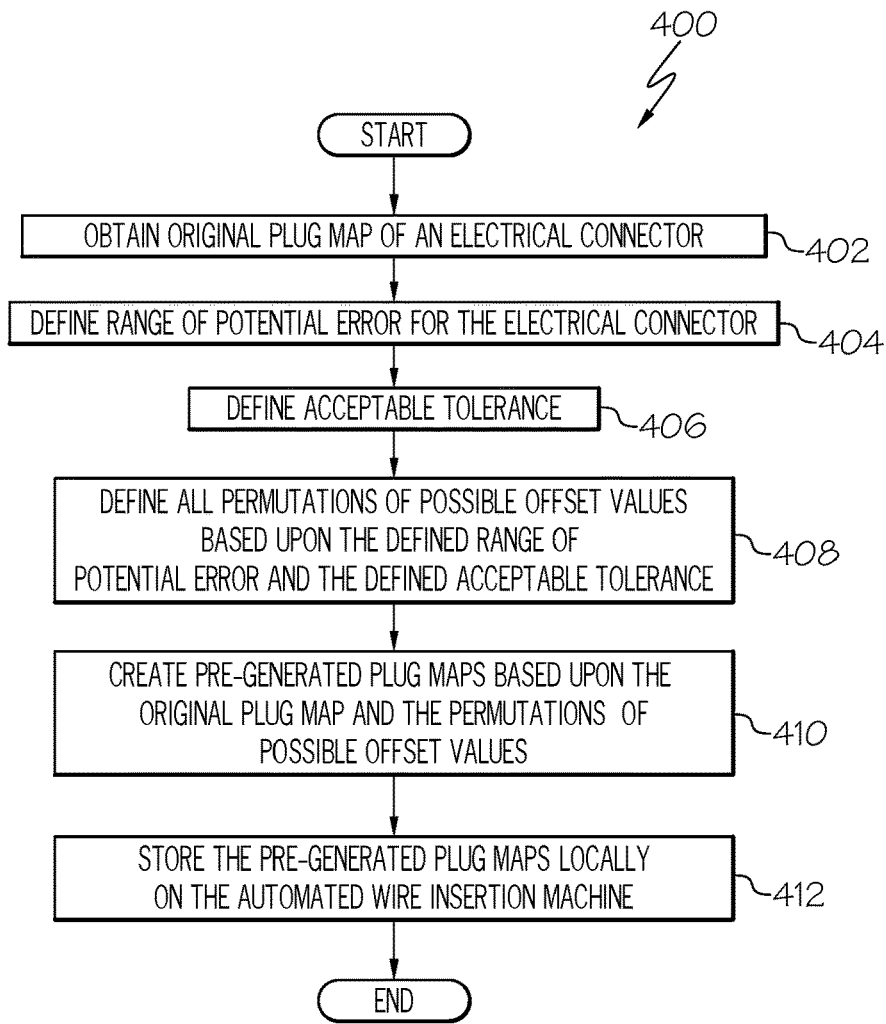
FIG. 4 is a flow diagram depicting an example method of operating the example computer system of FIG. 2 to pre-generate plug maps having offset values in accordance with an embodiment.

Referring to FIG. 4, flow diagram 400 depicts an example method of operating the example computer system of FIG. 2 to pre-generate plug maps having offset values in accordance with an embodiment. In block 402, an original plug map of an electrical connector, such as electrical connector 112 shown in FIG. 1, is obtained. The original plug map contains data that represents spatial coordinates corresponding to the centroid of each of grommet cavity locations of an ideally-manufactured electrical connector. This data can be obtained, for example, from the manufacturer of electrical connector 112. The process then proceeds to block 404.

In block 404, a range of potential rotational error for electrical connector 112 is defined. For example, the range of potential rotational error may be defined as ±3.0 degrees. In block 406, an acceptable rotational tolerance is defined. For example, the rotational tolerance may be defined as 0.1 degrees. The process then proceeds to block 408.

In block 408, all permutations of possible rotational offset values are calculated and defined based upon the range of potential error defined in block 404 and the acceptable rotational tolerance defined in block 406. Then, in block 410, plug maps having offset values (such as plug map 300 having offset values shown in FIG. 3) are created based upon the original plug map obtained in block 402 and the permutations of possible rotational offset values defined in block 408. Given the example range of potential rotational error of ±3.0 degrees and the example acceptable rotational tolerance of 0.1 degrees, this would result in sixty different plug maps with offset values (i.e., offset values of ±0.1°; ±0.2°; ±0.3° . . . ±2.8°; ±2.9°;±3.0°).

As an example, new X coordinate portion of a coordinate pair is equal to $\cos(\theta)X-\sin(\delta)Y$. Each new Y coordinate portion of a coordinate pair is equal to $\sin(\theta)X+\cos(\theta)Y$. The angle $\theta$ is defined as the angle between zero and 360 degrees, or between zero and $2\pi$ radians. Thus, in this example, there are a total of sixty-one plug maps (i.e., the original plug map and the sixty plug maps with offset values) associated with electrical connector 112. The process then proceeds to block 412.

In block 412, the total of sixty-one plug maps (i.e., the original plug map and the sixty pre-generated plug maps with offset values) associated with electrical connector 112 are stored locally in data storage unit 104 of automated wire insertion machine 100. It is conceivable that original plug maps and corresponding plug maps with offset values associated with other electrical connectors be stored locally in data storage unit 104 of automated wire insertion machine 100. The process then ends.

Figure 5:
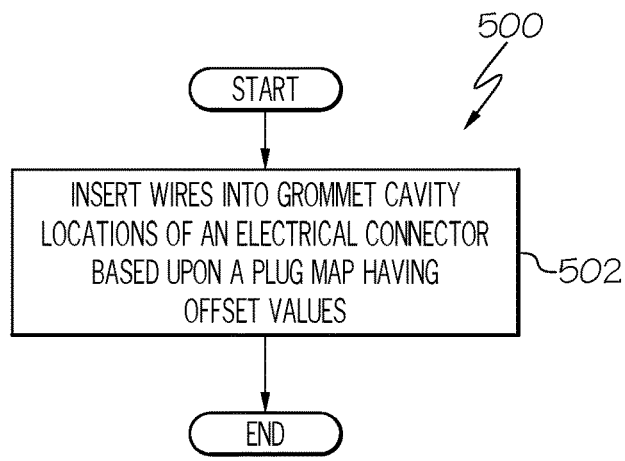
FIG. 5 is a flow diagram depicting an example method of operating the example automated wire insertion machine of FIG. 1 in accordance with an embodiment.

Referring to FIG. 5, flow diagram 500 depicts an example method of operating the example automated wire insertion machine 100 of FIG. 1 in accordance with an embodiment. In block 502, wires are inserted into grommet cavity locations 110 of electrical connector 112 (FIG. 1) based upon a plug map having offset values that is stored in data storage unit 104 of automated wire insertion machine 100. The process then ends.

Figure 6:
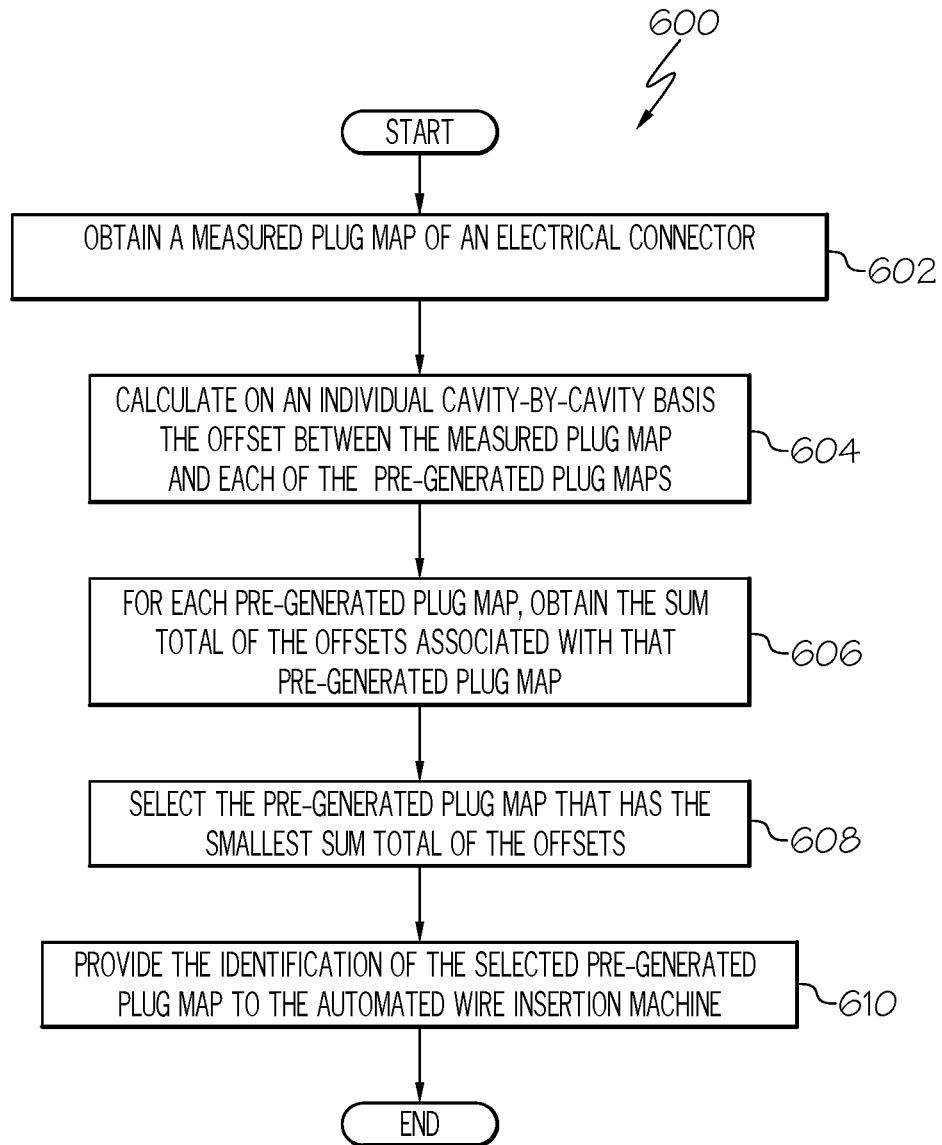
FIG. 6 is a flow diagram depicting an example method of operating the computer system of FIG. 2 to provide a selected pre-generated plug map having offset values for the automated wire insertion machine of FIG. 1.

Referring to FIG. 6, flow diagram 600 depicts an example method of operating computer system 200 of FIG. 2 to provide a selected pre-generated plug map having offset values for automated wire insertion machine 100 of FIG. 1. In this example embodiment, the original plug map and the plug maps with offset values that were pre-generated in FIG. 4 are also stored in data storage unit 202 of computer system 200 (FIG. 2). Flow diagram 600 shows a process to select the most closely matching pre-generated plug map.

In block 602, a measured plug map of electrical connector 112 shown in FIG. 1 is obtained. The measured plug map contains data that represents spatial coordinates corresponding to the centroid of each of grommet cavity locations 110 of electrical connector 112. This data can be obtained, for example, by a vision system (not shown) that captures an image of electrical connector 112. An example vision system that can be used to provide a measured plug map comprises model IN-SIGHT® 5605 manufactured by Cognex Corporation located in Natick, Mass., U.S.A. Vision software of vision system is trained to locate the true location of the centroid of each individual cavity. The true location of each cavity is provided in the same Cartesian coordinate system (X, Y) of the original plug map. The process then proceeds to block 604.

In block 604, the offset between the measured plug map and each of the pre-generated plug maps is calculated on an individual cavity-by-cavity basis. Then, in block 606, for each pre-generated plug map, the sum of offset values associated with that particular pre-generated plug map is calculated. More specifically, the distance formula represented as follows is used to calculate each offset value.

$$\text{Offset Value} = [(X_2 - X_1)^2 + (Y_2 - Y_1)^2]^{1/2}$$

where $(X_1, Y_1)$ are the spatial coordinates of a point from the measured plug map; and $(X_2, Y_2)$ are the spatial coordinates of a point from a pre-generated plug map.

Each offset value is representative of the distance away from the true location of the associated grommet cavity location of electrical connector 112. This process is repeated for each of the cavities for each pre-generated plug map. A sum of all offset values associated with each pre-generated plug map is then obtained. Thus, sixty sum of offset values are provided. The process then proceeds to block 608.

In block 608, the pre-generated plug map with the smallest sum of offset values is selected. This selected pre-generated plug map is the closest match (i.e., the "best match" or "best fit") to the measured plug map obtained in block 602. Then, in block 610, the selected pre-generated plug map of block 608 is identified, for example, by its plug map number. The plug map number is provided to automated wire insertion machine 100 (FIG. 1) to allow machine 100 to retrieve the corresponding pre-generated plug map from data storage unit 104 to insert wires into grommet cavity locations 110 of electrical connector 112 based on the identified pre-generated plug map. The process of flow diagram 600 of FIG. 6 then ends.

Figure 7:
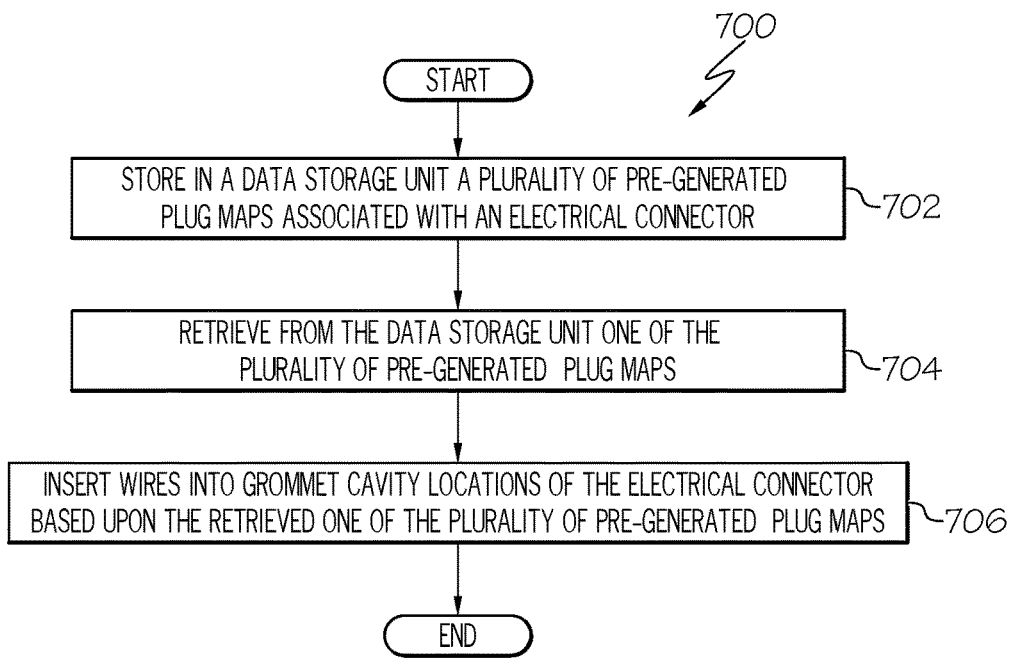
FIG. 7 is a flow diagram depicting an example method of operating the automated wire insertion machine of FIG. 1 in accordance with another embodiment.

Referring to FIG. 7, flow diagram 700 depicts an example method of operating the automated wire insertion machine 100 of FIG. 1 in accordance with another embodiment. In block 702, a plurality of pre-generated plug maps associated with electrical connector 112 is stored in data storage unit 104 of automated wire insertion machine 100. Then, in block 704, one of the pre-generated plug maps stored in data storage unit 104 is retrieved. In block 706, wires are inserted into grommet cavity locations 110 of electrical connector 112 based upon the pre-generated plug map retrieved in block 704. The process then ends.

Figure 8:
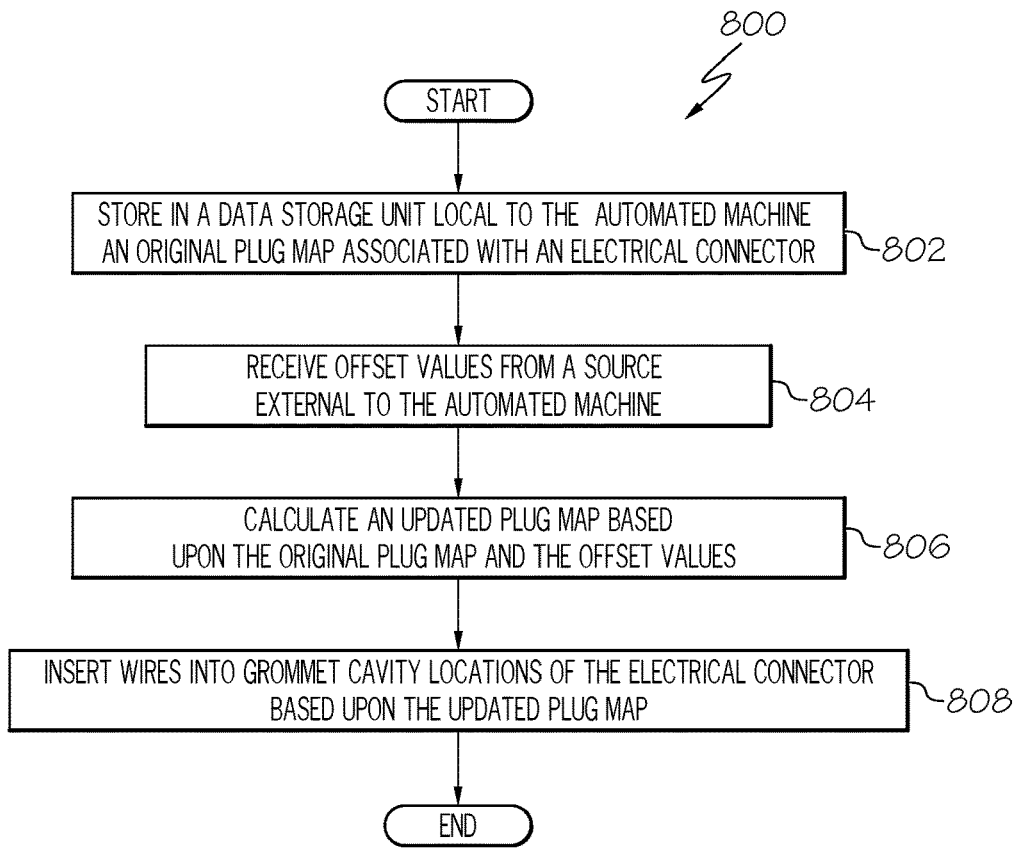
FIG. 8 is a flow diagram depicting an example method of operating the automated wire insertion machine of FIG. 1 in accordance with yet another embodiment.

Referring to FIG. 8, flow diagram 800 depicts an example method of operating the automated wire insertion machine of FIG. 1 in accordance with yet another embodiment. In block 802, an original plug map associated with electrical connector 112 is stored locally in data storage unit 104 of automated wire insertion machine 100. Then, in block 804, offset values are received from a source external to automated wire insertion machine 100. The offset values may be obtained by taking the difference for each point between an original plug map and a measured plug map, for example. The measured plug map can be obtained by a vision system, for example. The process proceeds to block 806.

In block 806, an updated plug map is calculated based upon an original plug map stored in data storage unit 104 and the offset values received in block 804. The updated plug map is stored in data storage unit 104. Then, in block 808, wires are inserted into grommet locations 110 of electrical connector 112 based upon the updated plug map of block 806. The process of flow diagram 800 of FIG. 8 then ends.

It should be apparent that the above-described plug maps with offset values enable automated insertion of wires into grommet cavity locations of an electrical connector to compensate for manufacturing tolerances associated with the electrical connector. Plug maps with offset values are needed to enable automated wire insertion because grommet cavity locations of electrical connectors do not have exact locations and dimensions. The offset values are needed to avoid collision of a wire with the electrical connector when the wire is being inserted. Wires are inserted with a much lower risk of a failed wire insertion.

It should also be apparent that the stored permutations of offset values enable a fast robotic insertion of wires into grommet cavity locations of the electrical connector. While a large number of pre-generated plug maps with offset values would be difficult to search through manually, it would be relatively easy to use a processing unit to search through the large number of pre-generated plug maps with offset values.

Although the above description describes rotational offset values, it is conceivable that translational offset values, or a combination of rotational offset values and translational offset values be used.

Also, although the above description describes sixty plug maps having offset values being pre-generated, it is conceivable that any number of plug maps having offset values could be pre-generated. For examples, the number of plug maps having offset values could be hundreds, thousands, or even tens of thousands, depending upon the range of potential error and the acceptable tolerance for the particular application.

Further, although the above describes plug maps having offset values being used for automated wire insertion in grommet cavity locations of MIL-spec type of electrical connectors, it is conceivable that plug maps having offset values be used for automated insertion in grommet cavity locations of non-MIL-spec type of electrical connectors.

Although the above-description describes methods for facilitating automated wire insertion into grommet cavity locations of electrical connectors for airplane parts in the aviation industry in accordance with FAA regulation, it is contemplated that the methods may be implemented to facilitate automated wire insertion for any type of electrical connector in any industry in accordance with the applicable industry standards.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although various aspects of disclosed embodiments have been shown and described, modifications may occur to those skilled in the art upon reading the specification. The present application includes such modifications and is limited only by the scope of the claims.

What is claimed is:

1. An automated wire insertion machine for inserting wires into grommet cavity locations of an electrical connector, the automated wire insertion machine comprising:
    a controllable wire insertion robot; and
    a processor to generate a plurality of pre-generated plug maps based upon an original plug map of the grommet cavity locations of the electrical connector and to control the controllable wire insertion robot based upon one pre-generated plug map of the plurality of pre-generated plug maps to insert the wires into the grommet cavity locations of the electrical connector,
    wherein the plurality of pre-generated plug maps is generated by:
        defining a range of potential error of the grommet cavity locations of the electrical connector that comprises at least one of a potential rotational error and a potential translational error;
        defining an acceptable tolerance of the grommet cavity locations of the electrical connector that comprises at least one of an acceptable rotational tolerance and an acceptable translational tolerance; and
        calculating offset values of the grommet cavity locations of the electrical connector based on the range of potential error and the acceptable tolerance, thereby generating the plurality of pre-generated plug maps.

2. The automated wire insertion machine according to claim 1 further comprising:
    a storage to store the plurality of pre-generated plug maps.

3. The automated wire insertion machine according to claim 2, wherein the processor retrieves from the storage one pre-generated plug map of the plurality of pre-generated plug maps.

4. The automated wire insertion machine according to claim 1, wherein the processor selects one of the plurality of pre-generated plug maps that comprises the closest matching pre-generated plug map for the electrical connector based upon the offset values associated with each of the plurality of pre-generated plugs maps.

5. The automated wire insertion machine according to claim 4, wherein a selected pre-generated plug map corresponds to the pre-generated plug map used to insert wires into grommet cavity locations of the electrical connector.

6. The automated wire insertion machine according to claim 4, wherein the processor selects the one of the plurality of pre-generated plug maps by:
    obtaining a measured plug map that represents spatial coordinates corresponding to a centroid of each grommet cavity location of the electrical connector;
    calculating second offset values based on the grommet cavity locations in the measured plug map relative to the grommet cavity locations in a pre-generated plug map; and
    calculating a sum of the offset values between the measured plug map and a generated plug map.

7. The automated wire insertion machine according to claim 6, wherein the measured plug map is obtained using a vision system to capture an image of the electrical connector.

8. The automated wire insertion machine according to claim 1, wherein the plurality of pre-generated plug maps are generated by calculating all permutations of possible offset values of the grommet cavity locations of the electrical connector based on the range of potential error and the acceptable tolerance.

9. The automated wire insertion machine according to claim 1, wherein the controllable wire insertion robot inserts the wires into the grommet cavity locations of the electrical connector based upon one pre-generated plug map of the plurality of pre-generated plug maps.

10. The automated wire insertion machine according to claim 1, wherein the plurality of pre-generated plug maps is generated by defining the range of potential error of the grommet cavity locations of the electrical connector that comprises both the potential rotational error and the potential translational error.

11. The automated wire insertion machine according to claim 10, wherein the plurality of pre-generated plug maps is generated by defining the acceptable tolerance of the grommet cavity locations of the electrical connector that comprises both the acceptable rotational tolerance and the acceptable translational tolerance.

12. The automated wire insertion machine according to claim 11, wherein the plurality of pre-generated plug maps is generated by calculating all permutations of possible offset values of the grommet cavity locations of the electrical connector based on the range of potential error and the acceptable tolerance.

13. The automated wire insertion machine according to claim 12, wherein the controllable wire insertion robot inserts the wires into the grommet cavity locations of the electrical connector based upon one pre-generated plug map of the plurality of pre-generated plug maps.

14. The automated wire insertion machine according to claim 1 further comprising:
    a storage to store the original plug map associated with the electrical connector.

15. The automated wire insertion machine according to claim 14, wherein the offset values have been received from a source external to the automated wire insertion machine.

16. The automated wire insertion machine according to claim 15 wherein the processor is further configured to calculate the plug map having offset values based upon the original plug map stored in the storage and the offset values that have been received from the source external to the automated wire insertion machine.

17. The automated wire insertion machine according to claim 1, wherein the offset values comprise at least one of rotational offset values and translational offset values.

18. The automated wire insertion machine according to claim 1, wherein the offset values are calculated on an individual cavity-by-cavity basis.

19. A method of operating an automated machine for inserting wires into grommet cavity locations of an electrical connector to compensate for manufacturing tolerances associated with the electrical connector, the method comprising:
    generating a plurality of pre-generated plug maps based upon an original plug map of the grommet cavity locations of the electrical connector, the generating comprising:
        defining a range of potential error of the grommet cavity locations of the electrical connector that comprises at least one of a potential rotational error and a potential translational error;
        defining an acceptable tolerance of the grommet cavity locations of the electrical connector that comprises at least one of an acceptable rotational tolerance and an acceptable translational tolerance; and
        calculating offset values of the grommet cavity locations of the electrical connector based on the range of potential error and the acceptable tolerance, thereby creating the plurality of pre-generated plug maps;
    storing in a storage the plurality of pre-generated plug maps associated with the electrical connector;
    retrieving from the storage one pre-generated plug map of the plurality of pre-generated plug maps; and
    inserting the wires into the grommet cavity locations of the electrical connector based upon the retrieved one pre-generated plug map of the plurality of pre-generated plug maps to compensate for manufacturing tolerances associated with the electrical connector.

20. A method of operating an automated machine for inserting wires into grommet cavity locations of an electrical connector to compensate for manufacturing tolerances associated with the electrical connector, the method comprising:
    storing in a storage local to the automated wire insertion machine an original plug map of the grommet cavity locations of the electrical connector;
    receiving offset values of the grommet cavity locations of the electrical connector based on a range of potential error, comprising at least one of a potential rotational error and a potential translational error, and an acceptable tolerance, comprising at least one of an acceptable rotational tolerance and an acceptable translational tolerance, of the grommet cavity locations from a source external to the automated wire insertion machine;
    calculating an updated plug map based upon the original plug map and the offset values; and
    inserting the wires into the grommet cavity locations of the electrical connector based upon the updated plug map to compensate for manufacturing tolerances associated with the electrical connector.

* * * * *